(12) United States Patent
Champagne

(10) Patent No.: US 8,821,165 B2
(45) Date of Patent: Sep. 2, 2014

(54) HOOF MOUNTING FOR FARRIER TRAINING SYSTEM

(71) Applicant: Wesley Jon Champagne, Altadena, CA (US)

(72) Inventor: Wesley Jon Champagne, Altadena, CA (US)

(*) Notice: Subject to any disclaimer, the term of this patent is extended or adjusted under 35 U.S.C. 154(b) by 0 days.

(21) Appl. No.: 14/160,847

(22) Filed: Jan. 22, 2014

(65) Prior Publication Data
US 2014/0205975 A1 Jul. 24, 2014

Related U.S. Application Data

(63) Continuation of application No. PCT/US2013/038642, filed on Apr. 29, 2013.

(60) Provisional application No. 61/755,396, filed on Jan. 22, 2013.

(51) Int. Cl.
*A01L 11/00* (2006.01)
*G09B 19/24* (2006.01)

(52) U.S. Cl.
CPC ............... *G09B 19/24* (2013.01); *A01L 11/00* (2013.01)
USPC .......................................... 434/225; 168/45

(58) Field of Classification Search
CPC .................................. A01L 11/00; A01L 13/00
USPC ....................... 434/44, 219, 225, 247; 168/45
See application file for complete search history.

(56) References Cited

U.S. PATENT DOCUMENTS

| 2,721,419 | A |   | 10/1955 | Carstensen |
| 3,117,520 | A | * | 1/1964  | Kerr et al. .................... 244/3.24 |
| 3,309,791 | A |   | 3/1967  | Kelley et al. |
| 3,716,941 | A |   | 2/1973  | Dowden et al. |
| 3,952,449 | A |   | 4/1976  | Terzian |
| 4,640,515 | A |   | 2/1987  | Rhine |
| 4,810,196 | A |   | 3/1989  | Walker |
| 4,964,836 | A |   | 10/1990 | Kamei |
| 5,709,386 | A |   | 1/1998  | Nelson |
| 5,853,293 | A |   | 12/1998 | Miller et al. |

(Continued)

OTHER PUBLICATIONS

"Black & Decker 20V Lithium Battery, Model #LBXR20," http://web.archive.org/web/20110518234530/http://www.blackanddecker.com/attachments/LBXR20.aspx, May 18, 2011.*

(Continued)

*Primary Examiner* — Sam Yao
*Assistant Examiner* — Jennifer L Fassett
(74) *Attorney, Agent, or Firm* — David A. Belasco; Belasco Jacobs & Townsley, LLP

(57) ABSTRACT

A hoof mounting for a farrier training includes a positioning block with a fixture for attaching to a central shaft of an artificial horse leg. The block has a front surface, a rear surface and first and second side surfaces and first and second securing ledges that extend laterally from the side surfaces. An artificial hoof has an open interior space with a partially open top, a closed bottom, a closed front wall, closed first and second side walls and an open back. The side walls have mating grooves sized and shaped to fit slidably about the securing ledges. At least one securing channel extends from a closed portion of the partially open top into one the mating grooves. A fastening latch has an activating tab and a locking portion that is slidably mounted to the positioning block and fits the securing channel when the block is within the hoof.

6 Claims, 7 Drawing Sheets

(56) References Cited

U.S. PATENT DOCUMENTS

| | | | |
|---|---|---|---|
| 5,976,019 | A | 11/1999 | Ikeda et al. |
| 6,165,043 | A | 12/2000 | Terzian et al. |
| 6,484,068 | B1 | 11/2002 | Yamamoto et al. |
| 7,494,341 | B2 * | 2/2009 | Champagne et al. ......... 434/225 |
| 2008/0110645 | A1 | 5/2008 | Ross |
| 2013/0052626 | A1 * | 2/2013 | Hoskins ....................... 434/268 |

OTHER PUBLICATIONS

International Search Report and the Written Opinion of the International Searching Authority, dated Oct. 16, 2013, as cited in PCT/US2013/038642 (8pgs).

Novelty Search dated Jan. 19, 2007 (4pgs).

Novelty Search dated Jun. 9, 2010 (3pgs).

International Search Report and Written Opinion for International Application No. PCT/US2013/038642, dated Oct. 16, 2013, pp. 1-8.

* cited by examiner

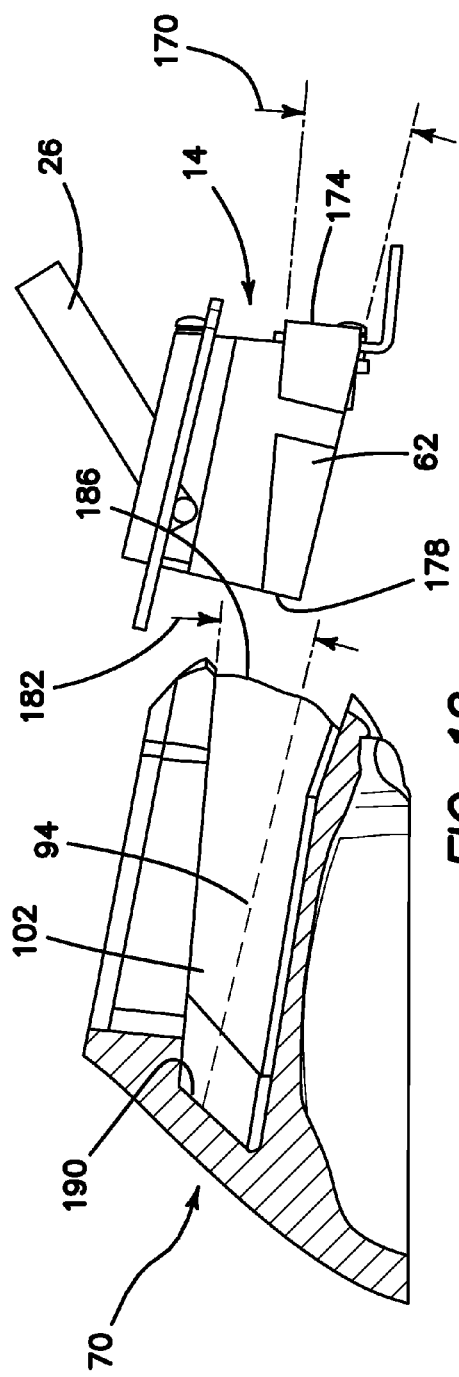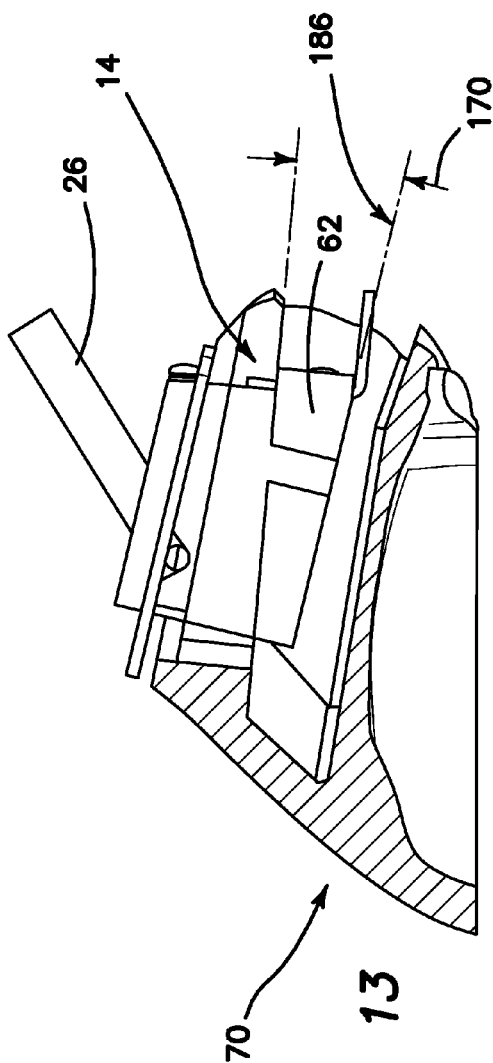
FIG. 12
FIG. 13

HOOF MOUNTING FOR FARRIER TRAINING SYSTEM

RELATED APPLICATION

This application is a Continuation Application under 35 U.S.C. §111(a) of U.S. PCT Application Serial Number PCT/US2013/038642 filed Apr. 29, 2013, which claims priority to U.S. Provisional Application Ser. No. 61/755,396, filed Jan. 22, 2013, the contents of both are hereby incorporated in their entirety herein.

FIELD OF INVENTION

This invention relates to the field of training systems, and more specifically to a training system for teaching farriers to make and attach horseshoes to the hooves of horses.

BACKGROUND OF THE INVENTION

The horse's hoof is composed of five major regions: the wall, the sole, the frog, the periople and the white line. The hoof grows as a result of cell division in the outer horn-producing cell layer of the sensitive structures of the hoof, namely the perioplic ring, the coronary band and the sensitive laminae. This process may be affected by many factors such as diet, stresses, injuries and diseases. In such cases, a distorted hoof is often produced. The hoof wall is of primary concern. It bears most of the horse's weight, is the most subject to wear and trauma and is the point of attachment of horseshoes, an invention designed to protect the hoof wall from rough terrain. Horseshoes have been employed for hundreds of years to help alleviate trauma to the horse's hooves, improve traction and to help heal damaged hooves.

The design and application of horse shoes requires the hands-on, personal attention of the farrier, previously known as a blacksmith. The farrier's job entails studying the hooves of a horse to be shod and selecting, adapting and even manufacturing horse shoes suitable to the individual horse. While there is substantial similarity in horse hooves, there are also many variations due to the factors mentioned above and simply due to genetic factors. After selecting and/or manufacturing suitable horse shoes, the farrier must safely install the horse shoes on the hooves of the horse. As horses tend to weigh 1000 lbs. or more and may have difficult personalities, the attachment of a horseshoe to the hoof of a horse without injury to the horse or the farrier is a task requiring considerable skill. Further complicating the work is the fact that the hoof must usually be trimmed to mate properly with the horseshoe and the shoe is typically attached with nails. If the nails are driven too deeply into the hoof, delicate capillaries may be injured and bleeding, discomfort and even infection may result.

Until recently, farriers were often trained using legs cut from dead horses. Recent legislation has severely limited such practices. The Applicant's prior invention, as described in U.S. Pat. No. 7,494,341, addresses all of these problems in the training of farriers. The present invention addresses methods and apparatus for efficiently mounting an artificial hoof to the artificial horse leg of Applicant's Farrier Training System.

U.S. Pat. No. 2,721,419, issued to Carstensen, discloses a toy horse. This device includes a body portion, a neck portion and a head portion. Depending from the body portion are leg members, each comprising an upper section, a lower section and a hoof. Attached to the hoof portion of each leg by means of simulated horseshoe nails is a simulated horseshoe. The horseshoes are capable of application to and removal from the hooves by a child. The hooves should be formed of a material suitable to receive the nails and from which these nails may subsequently be withdrawn. Such a material may be a soft wood, such as balsa or yucca. A resilient material such as rubber may also be suitable for this purpose. However, wood will generally be preferable inasmuch as the pounding of nails thereinto is accompanied with a good deal of noise; the creation of such noise having a great deal of appeal to children.

U.S. Pat. No. 5,853,293, issued to Weber et al. is directed to a medical teaching aid. This device comprises a main body portion formed in the shape of a human foot, a fabric conforming to the main body portion, and selected facsimiles of foot conditions which are selectively and releasably received by and retained on the fabric. Alternatively, the medical teaching aid includes simulated nails which also are selectively and releasably received by and retained on the fabric. The selected facsimiles may be prepared from cloth that will conform to the shape of the main body portion when applied to the outer surface of the fabric. The selected facsimiles may contain indicia representing the visual appearance of specific foot disorders.

U.S. Pat. No. 3,309,791, issued to Kelly et al. illustrates an artificial insemination teaching apparatus. This device comprises a rigid housing having an exterior configuration simulating the posterior of the animal for which instruction is being given. In operation, a course of instruction in the technique of artificial insemination utilizing this device involves having the student practice the identical steps on the teaching apparatus which are performed on the live animal during an actual insemination. While the student endeavors to perform this operation, the instructor stands back of wall of the housing and grasps a control handle in one hand and selectively pumps air into or releases air out of the double-walled cavity. During the instruction period, the instructor also pivots the housing by means of the handle. The pedestal and hinged mounting plates support the housing for pivotal movement about a vertical axis located forward of flexible wall and upon a horizontal axis parallel to and forward of the flexible wall so that the instructor may simulate typical side-to-side and up-and-down movements of a live animal during the insemination procedure. By appropriate movement of the body and introduction of air into the hollow walls of the cavity member, the instructor can create conditions that are at least as arduous as those present when working with live animals so that the student develops substantial skill with the teaching apparatus.

U.S. Pat. No. 4,810,196, issued to Walker disclose a mannequin for use in teaching cosmetology. This device, mannequin, includes a face portion, scalp, neck, and hair which is permanently attached to the scalp by conventional means. A base member supports the mannequin on a table. The hair includes a patterned section comprised of a plurality of colored line diagrams whereby the individual strands of hair or sections of hair are imprinted or coated with coloring material to indicate a line of cutting or other work application. Each of the line diagrams is preferably a different color, but it is possible in alternate embodiments to have fewer diagrams, utilize only one color and have them spaced apart, separated by the natural hair color. The coloring material used may be selected from any of the contemporary, multiple colors of dye used for temporarily coloring the hair; may be permanent dyes of any kind compatible with human hair; or acrylics which are applied to the surface of the hair shaft. Further, it is anticipated that invisible inks visible only under ultra violet light might be used. The ends of the hair, up to the line "h" are (example only) indicated as being red and on the actual model, the red line diagram might be approximately threequarters of an inch to one inch depth. In use, a student would be instructed to take off approximately one-third of the red portion, for a first hair cut. The instructor would then evaluate the cut and the student would be instructed to repeat the cut one or two more times, removing the entire red diagram.

It is an objective of the present invention to provide an apparatus that can quickly and easily attach an artificial hoof to the artificial leg of Applicant's Farrier Training System invention. It is a further objective to provide a methodology to allow such hooves to be readily attached and detached. Finally, it is an objective of the invention to provide for hooves to be interchangeable between multiple Farrier Training System legs.

While some of the objectives of the present invention are disclosed in the prior art, none of the inventions found include all of the requirements identified.

SUMMARY OF THE INVENTION

The present invention addresses all of the deficiencies of prior art hoof mounting for farrier training system inventions and satisfies all of the objectives described above.

(1) A hoof mounting for a farrier training system can be constructed from the following components. A positioning block is provided. The block has a fixture for attaching to a lower end of a central shaft located within an artificial leg of a farrier training system. The shaft extends outwardly from the leg. The block has at top surface, a bottom surface, a front surface, a rear surface, first and second side surfaces and first and second securing ledges. The ledges extend laterally from the first and second side surface. An artificial hoof is provided. The hoof has an open interior space. The space has, a partially open top, a closed bottom, a closed front wall, closed first and second side walls and an open back. The first and second side walls have mating grooves. The grooves are sized and shaped to fit slidably about the securing ledges.

At least one securing channel is provided. The channel extends from a closed portion of the partially open top into one the mating grooves. A fastening latch is provided. The latch has a vertically oriented locking portion and an activating tab. The locking portion is slidably mounted to the rear surface of the positioning block. The locking portion is sized, shaped and located to fit slidably within the securing channel when the block is located within the artificial hoof. The locking portion of the latch is urged upwardly by a resilient member to engage the securing channel.

(2) In a variant of the invention, the locking portion of the fastening latch is slidably mounted to the rear surface of the positioning block by a pair of vertical channels. The channels are sized and shaped to fit slidably about first and second side edges of the locking portion.

(3) In another variant, the resilient member is a spring. The spring is attached between the positioning block and the fastening latch.

(4) In still another variant, the positioning block is pivotally mounted to the lower end of the central shaft.

(5) In yet another variant, the positioning block further comprises a surrounding groove. The groove surrounds at least the front surface and the first and second side surfaces. The groove is spaced downwardly from the top surface and spaced above the first and second securing ledges.

(6) In a further variant, a support platform is provided, the support platform has upper and lower parallel, planar surfaces. The platform is sized and shaped to fit between a lower surface of the artificial leg of a farrier training system and a top surface of the artificial hoof. The support platform has a central notch. The notch is sized and shaped to fit slidably within the surrounding groove.

(7) In still a further variant, the bottom surface of the positioning block is spaced upwardly from the closed bottom of the artificial hoof when the positioning block is secured within the hoof by the fastening latch.

(8) In a final variant, the first and second securing ledges include a taper from a rear end to a front end of the ledges and the mating grooves include a mating taper from a posterior end to an anterior end of the grooves, thereby providing a tightening fit as the control block is introduced into the artificial hoof.

An appreciation of the other aims and objectives of the present invention and an understanding of it may be achieved by referring to the accompanying drawings and the detailed description of a preferred embodiment.

DESCRIPTION OF THE DRAWINGS

FIG. 12 is an exploded, side elevational cross-sectional view of the FIG. 1 embodiment, illustrating insertion of the positioning block into the artificial hoof; and FIG. 13 is an exploded, side elevational cross-sectional view of the FIG. 1 embodiment, illustrating the positioning block inserted into the artificial hoof.

DETAILED DESCRIPTION OF THE PREFERRED EMBODIMENT (1) FIGS. 1-13 illustrate a hoof mounting for a farrier training system 10 providing the desired features that may be constructed from the following components. A positioning block 14, as illustrated in FIGS. 4-6, is provided. The block 14 has a fixture 18 for attaching to a lower end 22 of a central shaft 26 located within an artificial leg 30 of a farrier training system (not shown). The shaft 26 extends outwardly from the leg 30. The block 14 has at top surface 38, a bottom surface 42, a front surface 46, a rear surface 50, first 54 and second 58 side surfaces and first 62 and second 66 securing ledges. The ledges 62, 66 extend laterally from the first 54 and second 58 side surface. An artificial hoof 70, as illustrated in FIGS. 2-5 and 10-11, is provided. The hoof 70 has an open interior space 74. The space 74 has a partially open top 78, a closed bottom 82, a closed front wall 86, closed first 90 and second 94 side walls and an open back 98. The first 90 and second 94 side walls have mating grooves 98, 102. The grooves 98, 102 are sized and shaped to fit slidably about the securing ledges 62, 66.

At least one securing channel 104 is provided. The channel 104 extends from a closed portion 108 of the partially open top 78 into one the mating grooves 98, 102. As illustrated in FIGS. 5-9, a fastening latch 112 is provided. The latch 112 has a vertically oriented locking portion 116 and an activating tab 120. The locking portion 116 is slidably mounted to the rear surface 50 of the positioning block 14. The locking portion 116 is sized, shaped and located to fit slidably within the securing channel 104 when the block 14 is located within the artificial hoof 70. The locking portion 116 of the latch 112 is urged upwardly by a resilient member 124 to engage the securing channel 104.

Figure 1:
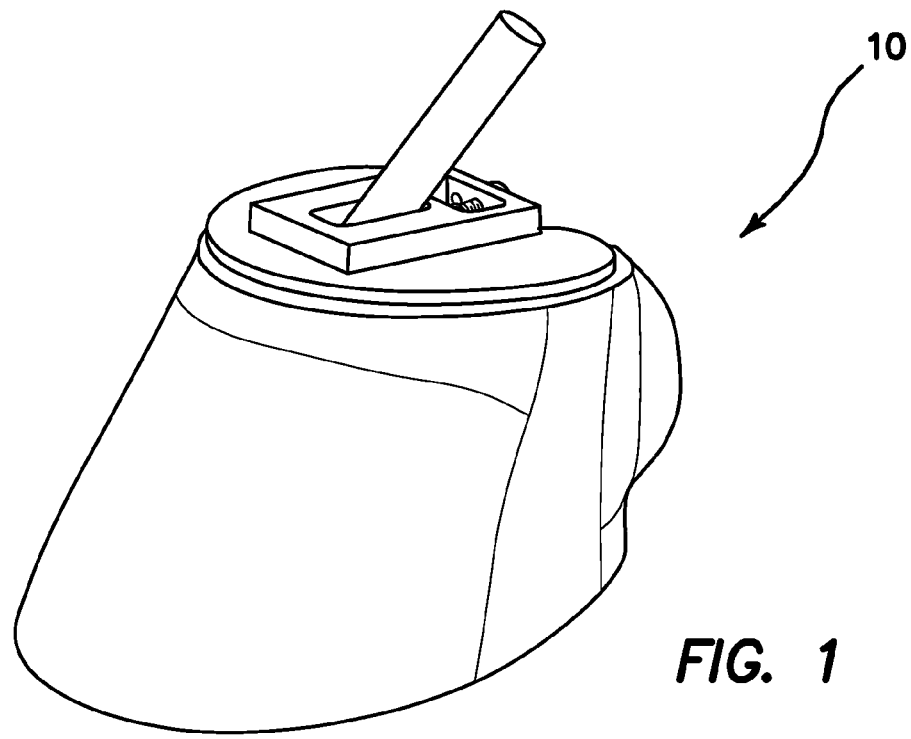
FIG. 1 is a perspective view of the preferred embodiment of the invention.
Figure 2:
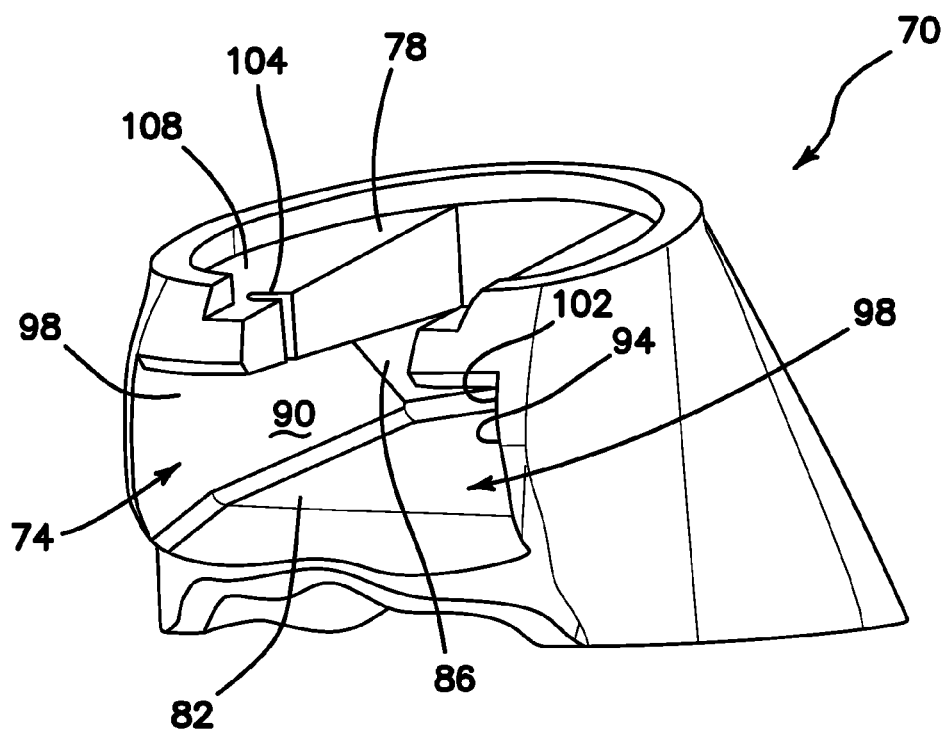
FIG. 2 is a rear perspective view of the removable artificial hoof of the FIG. 1 embodiment.
Figure 3:
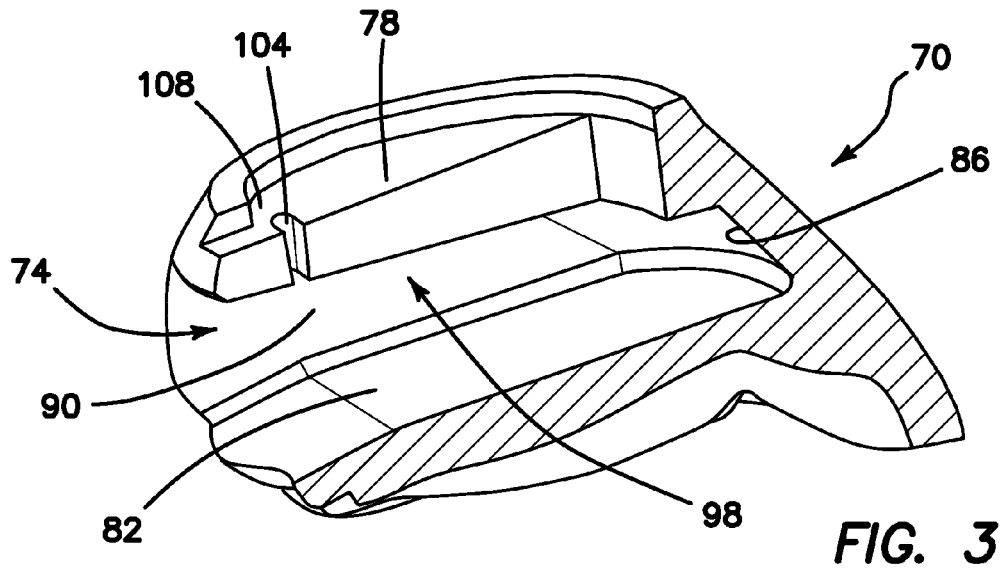
FIG. 3 is a cross-sectional perspective view of the removable artificial hoof of the FIG. 1 embodiment.

(2) In a variant of the invention, the locking portion 116 of the fastening latch 112 is slidably mounted to the rear surface 50 of the positioning block 14 by a pair of vertical channels 128. The channels 128 are sized and shaped to fit slidably about first 132 and second 136 side edges of the locking portion 116.

Figure 4:
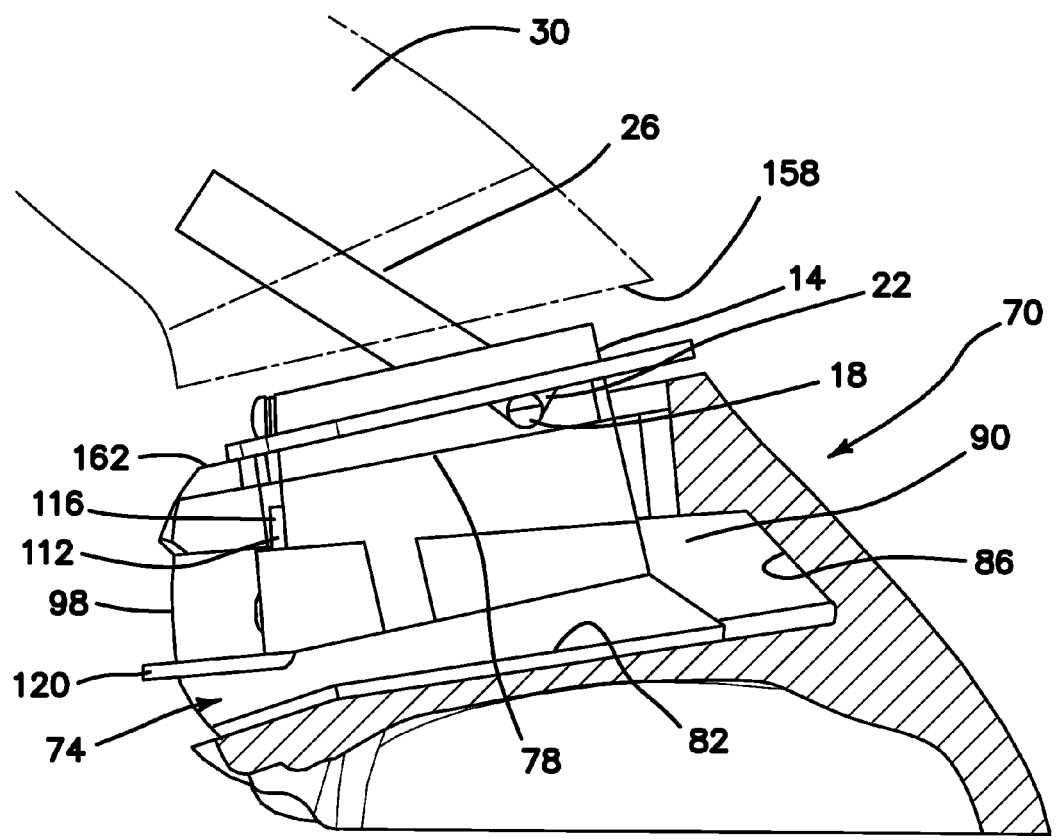
FIG. 4 is a cross-sectional view of the FIG. 1 embodiment attached to an artificial horse leg of a farrier training system.
Figure 5:
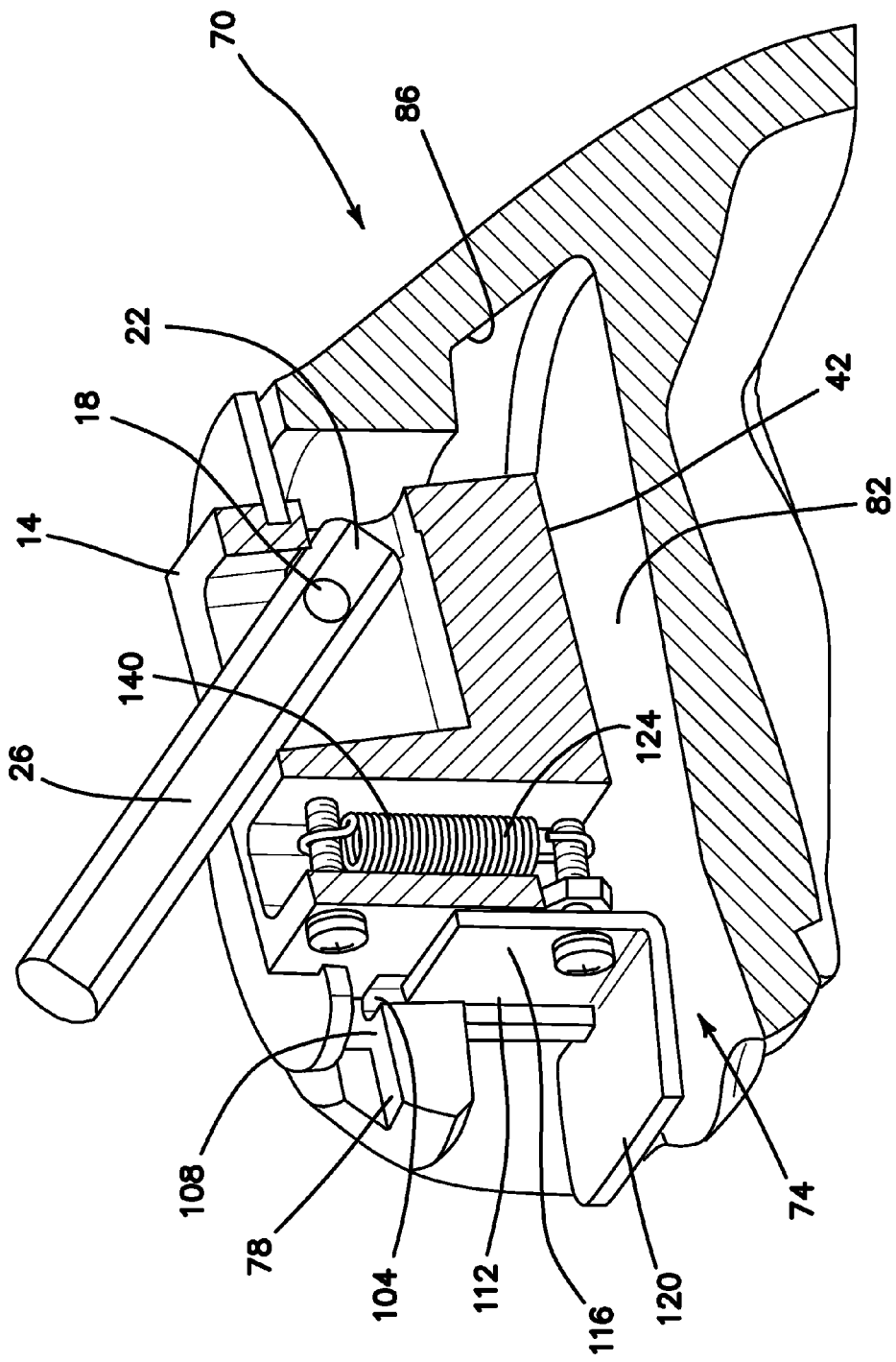
FIG. 5 is a detailed cross-sectional perspective view of the FIG. 1 embodiment illustrating the means of attaching the artificial hoof to the positioning block.

(3) In another variant, as illustrated in FIGS. 4 and 5, the resilient member 124 is a spring 140. The spring 140 is attached between the positioning block 14 and the fastening latch 112.

(4) In still another variant, the positioning block 14 is pivotally mounted to the lower end 22 of the central shaft 26.

Figure 6:
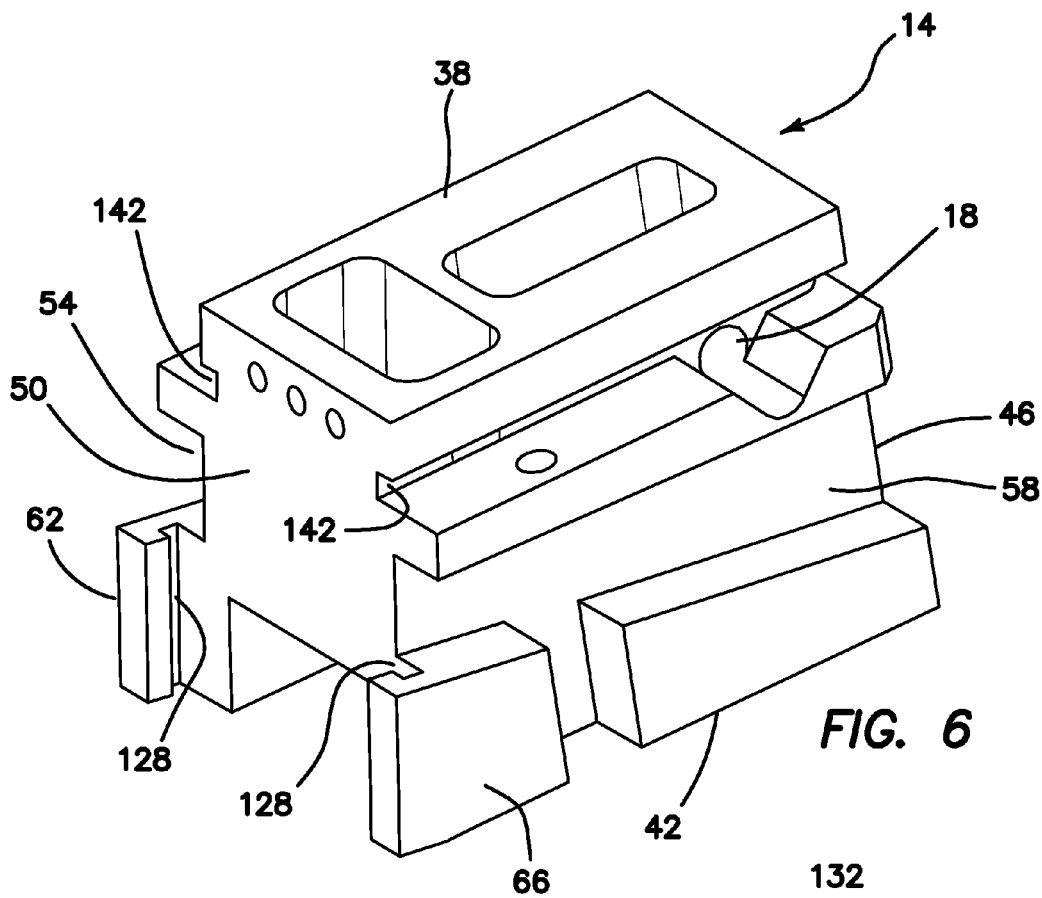
FIG. 6 is a perspective view of the positioning block of the FIG. 1 embodiment.
Figure 7:
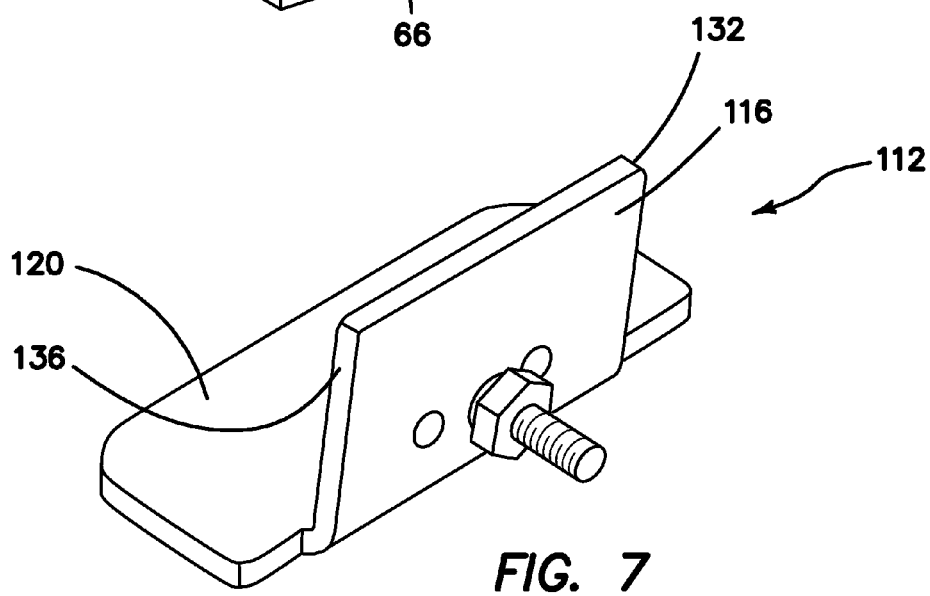
FIG. 7 is a perspective view of the fastening latch.

(5) In yet another variant, as illustrated in FIG. 6, the positioning block 14 further comprises a surrounding groove 142. The groove 142 surrounds at least the front surface 46 and the first 54 and second 58 side surfaces. The groove 142 is spaced downwardly from the top surface 38 and spaced above the first 62 and second 66 securing ledges.

Figure 8:
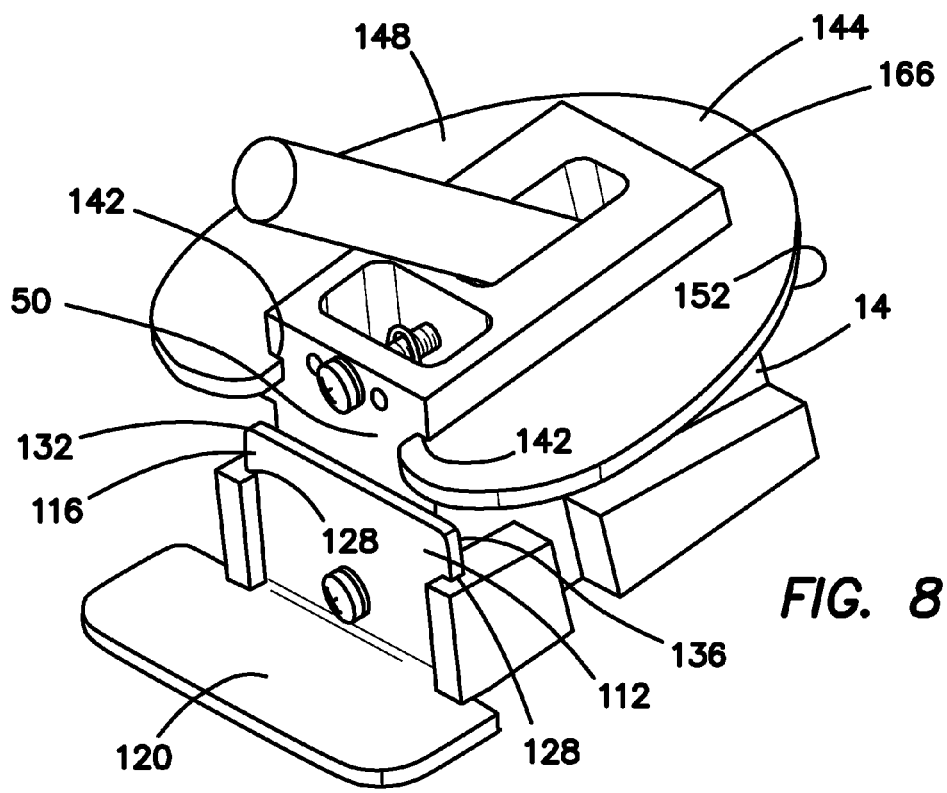
FIG. 8 is a perspective view of the positioning block with attached fastening latch attached to the central shaft of the artificial horse leg.
Figure 9:
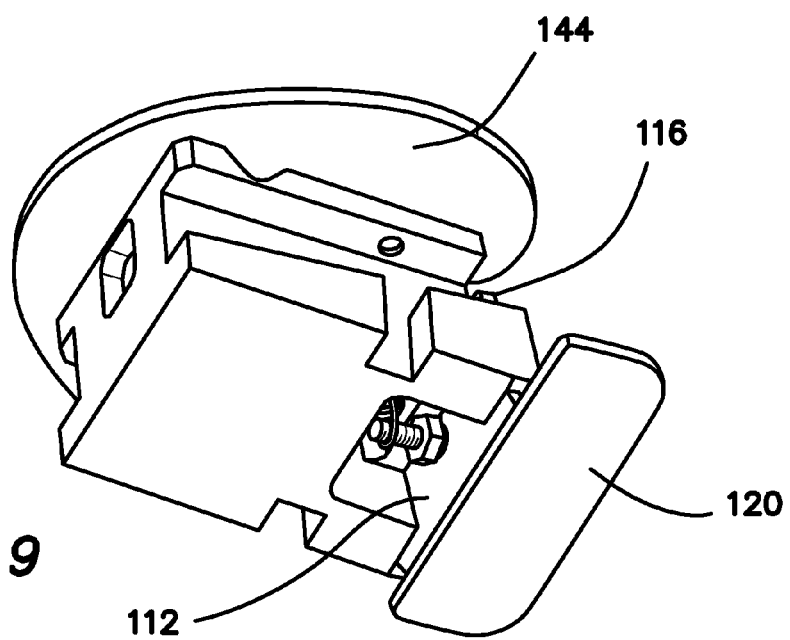
FIG. 9 is an upward looking perspective view of the positioning block with attached support platform.
Figure 10:
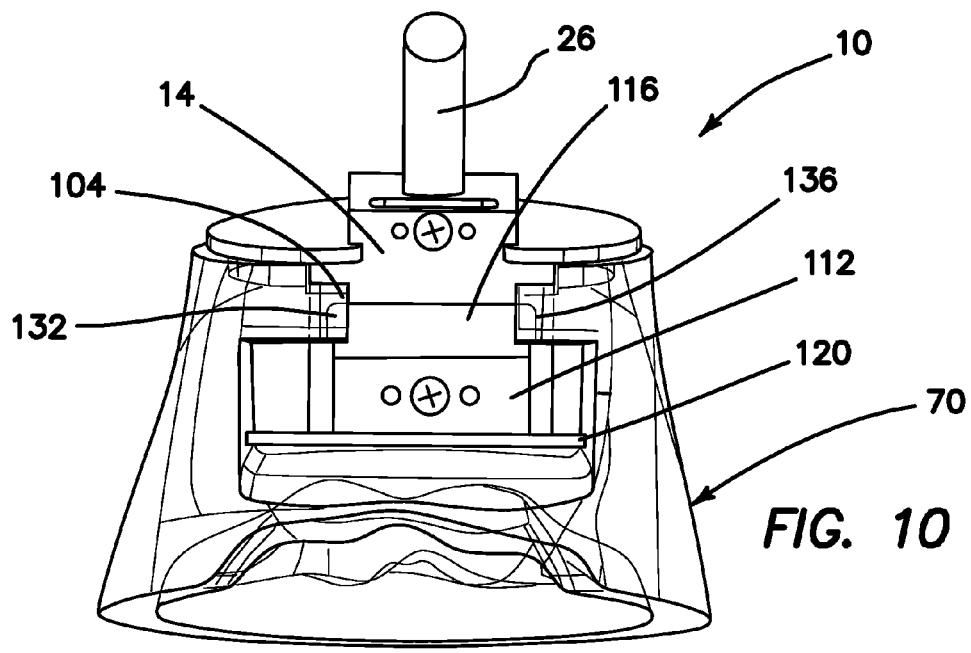
FIG. 10 is a rear view of the FIG. 1 embodiment with the fastening latch in an upper, attaching position.
Figure 11:
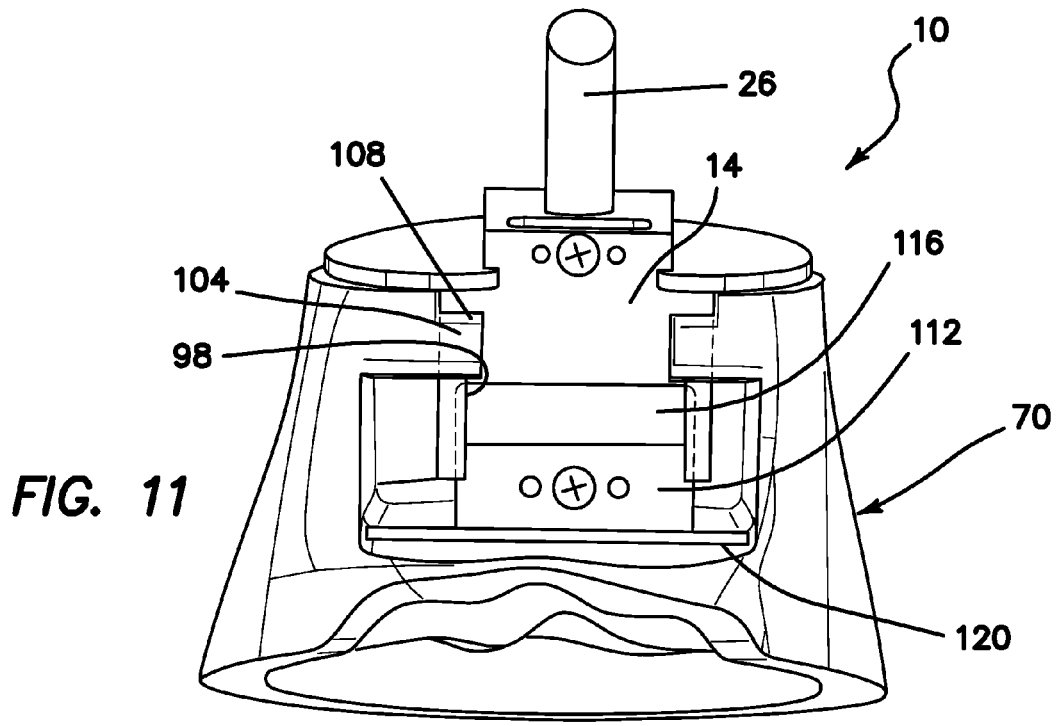
FIG. 11 is a rear view of the FIG. 1 embodiment with the fastening latch in a lower, releasing position.

(6) In a further variant, as illustrated in FIGS. 4, 8 and 9, a support platform 144 is provided, the support platform 144 has upper 148 and lower 152 parallel, planar surfaces. The platform 144 is sized and shaped to fit between a lower surface 158 of the artificial leg 30 of a farrier training system and a top surface 162 of the artificial hoof 70. The support platform 144 has a central notch 166. The notch 166 is sized and shaped to fit slidably within the surrounding groove 142.

(6) In a further variant, as illustrated in FIGS. 8 and 9, a support platform 144 is provided, the support platform 144 has upper 148 and lower 152 parallel, planar surfaces. The platform 144 is sized and shaped to fit between a lower surface 158 of the artificial leg 30 of a farrier training system and a top surface 162 of the artificial hoof 70. The support platform 144 has a central notch 166. The notch 166 is sized and shaped to fit slidably within the surrounding groove 142.

(7) In still a further variant, as illustrated in FIG. 5, the bottom surface 42 of the positioning block 14 is spaced upwardly from the closed bottom 82 of the artificial hoof 70 when the positioning block 14 is secured within the hoof 70 by the fastening latch 112.

(8) In a final variant, as illustrated in FIGS. 12 and 13, the first 62 and second 66 securing ledges include a taper 170 from a rear end 174 to a front end 178 of the ledges 62, 66 and the mating grooves 98, 102 include a mating taper 182 from a posterior end 186 to an anterior end 190 of the grooves 98, 102, thereby providing a tightening fit as the control block 14 is introduced into the artificial hoof 70.

The hoof mounting for a farrier training system 10 has been described with reference to particular embodiments. Other modifications and enhancements can be made without departing from the spirit and scope of the claims that follow.

The invention claimed is:

1. A hoof mounting for a farrier training system, comprising:

a positioning block, said block having a fixture for attaching to a distal end of a central shaft, said shaft disposed within an artificial leg of a farrier training system, said shaft extending outwardly therefrom;

said block having a top surface, a bottom surface, a front surface, a rear surface, first and second side surfaces and first and second securing ledges, said ledges extending laterally from said first and second side surfaces;

said positioning block further comprises a surrounding groove, said groove surrounding at least said front surface and said first and second side surfaces, said groove being spaced downwardly from said top surface and spaced above said first and second securing ledges;

an artificial hoof, said hoof having an open interior space, said space having, a partially open top, a closed bottom, a closed front wall, closed first and second side walls and an open back;

said first and second side walls having mating grooves, said mating grooves being sized and shaped to fit slidably about said securing ledges;

at least one securing channel, said channel extending from a closed portion of said partially open top into one of said mating grooves;

a fastening latch, said latch having a vertically oriented locking portion and an activating tab, said locking portion being slidably mounted to said rear surface of said positioning block;

said locking portion being sized, shaped and disposed to fit slidably within said securing channel when said block is disposed within said artificial hoof;

said locking portion of said latch being urged upwardly by a resilient member to engage said securing channel;

a support platform, said support platform having upper and lower parallel, planar surfaces, being sized and shaped to fit between a lower surface of said artificial leg of a farrier training system and a top surface of said artificial hoof; and said support platform having a central notch, said notch sized and shaped to fit slidably within said surrounding groove.

2. The hoof mounting for a farrier training system, as described in claim 1, wherein said locking portion of said fastening latch is slidably mounted to said rear surface of said positioning block by a pair of vertical channels, said channels being sized and shaped to fit slidably about first and second side edges of said locking portion.

3. The hoof mounting for a farrier training system, as described in claim 1, wherein said resilient member is a spring, said spring attached between said positioning block and said fastening latch.

4. The hoof mounting for a farrier training system, as described in claim 1, wherein said positioning block is pivotally mounted to said lower end of said central shaft.

5. The hoof mounting for a farrier training system, as described in claim 1, wherein said bottom surface of said positioning block is spaced upwardly from said closed bottom of said artificial hoof when said positioning block is secured within said hoof by said fastening latch.

6. The hoof mounting for a farrier training system, as described in claim 1, wherein said first and second securing ledges comprise a taper from a rear end to a front end of said ledges and said mating grooves comprise a mating taper from a posterior end to an anterior end of said grooves, thereby providing a tightening fit as said control block is introduced into said artificial hoof.

\* \* \* \* \*